US 7,514,525 B2

(12) United States Patent
Yu

(10) Patent No.: US 7,514,525 B2
(45) Date of Patent: Apr. 7, 2009

(54) RECOVERY AND PURIFICATION OF POLYHYDROXYALKANOATES

(75) Inventor: Jian Yu, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 84 days.

(21) Appl. No.: 11/684,110

(22) Filed: Mar. 9, 2007

(65) Prior Publication Data
US 2008/0220505 A1    Sep. 11, 2008

(51) Int. Cl.
*C08G 64/00*    (2006.01)
*C08G 63/02*    (2006.01)

(52) U.S. Cl. .................. 528/272; 424/489; 525/437; 528/271

(58) Field of Classification Search ................. 424/489; 525/437; 528/271, 272
See application file for complete search history.

(56) References Cited

U.S. PATENT DOCUMENTS

| | | | |
|---|---|---|---|
| 3,107,172 A | 10/1963 | Baptist et al. |
| 4,101,533 A | 7/1978 | Lafferty et al. |
| 4,310,684 A | 1/1982 | Vanlautem et al. |
| 4,324,907 A | 4/1982 | Senior et al. |
| 4,358,583 A | 11/1982 | Walker et al. |
| 4,391,766 A | 7/1983 | Barham et al. |
| 4,562,245 A | 12/1985 | Stageman |
| 4,705,604 A | 11/1987 | Vanlautem et al. |
| 4,910,145 A | 3/1990 | Holmes et al. |
| 5,110,980 A | 5/1992 | Ramsay et al. |
| 5,213,976 A | 5/1993 | Blauhut et al. |
| 5,894,062 A | 4/1999 | Liddell |
| 6,043,063 A | 3/2000 | Kurdikar et al. |
| 6,087,471 A | 7/2000 | Kurdikar et al. |
| 6,340,580 B1 | 1/2002 | Horowitz |
| 7,141,400 B2 | 11/2006 | Yu |
| 2005/0196827 A1* | 9/2005 | Osakada et al. ............... 435/41 |

OTHER PUBLICATIONS

G. Chen et al., Appl. Microbiol. Biotechnol., 2001, vol. 57, pp. 50-55.
Y. Chen et al., Process Biochem., 2001, vol. 36, pp. 773-779.
J. Choi et al., Biotechnol. Bioeng., 1999, vol. 62, No. 5, pp. 546-553.
V. Gorenflo et al., Biomacromolecules, 2001, vol. 2, pp. 45-57.
R. Griebel et al., Biochem., 1968, vol. 7, No. 10, pp. 3676-3681.
R. Hesselmann et al., J. Microbiol. Methods, 1999, vol. 35, pp. 111-119.
D. Lundgren et al., J. Bacteriol., 1965, vol. 89, No. 1, pp. 245-251.
W. Luzier, Proc. Natl. Acad. Sci., 1992, vol. 89, No. 3, pp. 839-842.
E. Stuart et al., J. Biotechnol., 1998, vol. 64, pp. 137-144.
Yu et al. Polym. Degrad. Stabil., 2005, vol. 89, pp. 289-299.
Yu et al., Biotechnol. Prog., 2006, vol. 22, pp. 547-553.

* cited by examiner

*Primary Examiner*—Terressa M Boykin
(74) *Attorney, Agent, or Firm*—Duane Morris LLP

(57) ABSTRACT

The present invention relates to a method to recover, purify and isolate polyhydroxyalkanoate (PHA) biopolymers from PHA-containing cell mass, which includes: (a) solubilizing the non-PHA cell mass in an acidic solution, leaving a suspension of partially crystallized PHA granules; (b) adjusting the pH of the suspension to 7-11 and separating the PHA solids from the dissolved non-PHA cellular mass; (c) resuspending the PHA solids in a bleaching solution for decolorization; and (d) drying the resulting PHA solids. About 95% or greater of original PHA in cell mass is recovered, and the purity of PHA solids is about 97% or above. The weight average molecular mass of the purified biopolyesters is about 500 kDa or greater.

18 Claims, 2 Drawing Sheets

RECOVERY AND PURIFICATION OF POLYHYDROXYALKANOATES

FIELD OF THE INVENTION

The present invention relates to polyhydroxyalkanoates, a family of biodegradable thermoplastic and elastic materials synthesized and accumulated in living cells. Specifically, the present invention relates to an effective processing technology for recovery and purification of such biodegradable polymers from cell mass.

BACKGROUND OF THE INVENTION

Polyhydroxyalkanoates (PHAs) are homopolymers or copolymers of hydroxyalkanoates, such as 3-hydroxybutyrate (3HB), 3-hydroxyvalerate (3HV), 4-hydroxyvalerate (4HV) and 3-hydroxyhexonate (3HH). These thermoplastic or elastic biopolyesters are synthesized and accumulated by many microorganisms, bacteria in particular, as carbon and energy storage materials. PHAs are conveniently synthesized by cultivating the microbial cells in an aqueous medium on a carbon source, including sugars, organic acids and alcohols. Depending on the species, carbon source, nutrients and culture conditions, the PHA biopolymers may account for up to 80 wt % of dry cell mass. Their average molecular size ranges from 1,000 to 2,000 kDa. PHAs can also be formed and accumulated in transgenic plant cells.

The PHA biopolymers are stored inside of the cells as discrete granules of about 0.2-0.6 μm in diameter. The inclusions contain about 5 to 10 wt % of water, and are largely amorphous. Each granule is surrounded by a phospholipid monolayer membrane in which proteins, including the PHA synthase and degradase, are located. Other proteins (phasins) are presumed to be involved in stabilization of the amorphous hydrophobic PHA inclusions suspended in cell cytoplasm. Although the dried "plastic" cell mass with a high PHA content (70-80 wt %) can be directly molded into articles, only purified PHA polymers can have the desired thermal and mechanical properties for a variety of applications in packaging, agriculture and health care. Compared to other bio-products of small and large molecules, PHA recovery poses a unique challenge, due to the solid state of PHA granules and non-PHA cell mass (NPCM). Two strategies are typically used in the recovery and purification of PHA from cell mass: PHA solubilization or NPCM dissolution. In the former, PHA macromolecules are dissolved in an appropriate organic solvent and extracted from the cells (NPCM), while in the latter, NPCM is digested and/or dissolved by agents while PHA polyesters are left in solid state form. The generated solid and liquid phases are separated by a unit operation such as filtration and centrifugation.

Solvent extraction of PHA is widely used in laboratories to prepare small quantities of high molecular weight PHA. It has also been used for PHA recovery at pilot-scale and large-scale, to a limited success. Only a few solvents are able to dissolve PHA macromolecules, particularly those of large molecular weight with a high content of short chain hydroxyalkanoates, such as 3-hydroxybutyrate and 3-hydroxyvalerate. Popular solvents are halogenated hydrocarbons such as chloroform and dichloromethane. The wet PHA-containing cells can be directly extracted with the water immiscible solvents, but pretreatment of cell mass is usually needed and performed, such as water removal at elevated temperature and extraction of lipids/pigments by PHA insoluble solvents, such as acetone and methanol. The pretreated cell mass is further subjected to extraction in hot chloroform or other appropriate solvents, and the dissolved PHA is separated from non-soluble cell mass by filtration and/or centrifugation. Unfortunately, a very viscous PHA solution is usually formed even at a relatively low PHA concentration (5% w/v), which renders such separation difficult. Precipitation of PHA by adding a PHA insoluble solvent (e.g., methanol) into the filtrate completes the separation and purification of PHA biopolymers from the solution. In general, solvent extraction results in pure and intact PHA macromolecules, but its major drawbacks include: (a) a large amount of organic solvent needed to make a dilute solution (less than 5 wt % PHA), (b) lengthy separation of the PHA solution from cell mass because of high viscosity of the solution, (c) high capital and operation costs for solvent recovery, and (d) loss of a large amount of volatile and possibly mutagenic organic solvents into the environment.

The PHA biopolymers can also be recovered and purified by digesting and/or solubilizing the non-PHA cell mass (NPCM), which leaves PHA granules in solid state. The NPCM comprises peptidoglycan, proteins, nucleic acids, phospholipids, and lipopolysaccharides. The cellular debris in aqueous solution, after digestion, can be easily removed from PHA granules by centrifugation and washing. Depending on the digestion agents and process conditions, the solubilization of non-PHA cell mass can be further classified into non-selective and selective dissolution. Sodium hypochlorite and sodium hydroxide are the representative agents for the former, while enzymes and anionic surfactants are representative of the latter.

Hypochlorite is a non-selective, powerful oxidation agent that digests both non-PHA biomass and PHA granules, resulting in a low recovery yield of PHA and reduced molecular weight (22 kDa) of purified polymers with poor mechanical strength. Many factors affect the purity, recovery yield and molecular size of PHA polymers, including temperature, pH, time and pretreatment of cell mass. Particularly, the dose of hypochlorite must be carefully adjusted according to the concentration of non-PHA cell mass, which is more often than not a variable, changing batch to batch in industrial fermentations. Careful control on hypochlorite ranging from 11 to 18 parts per part of NPCM is recommended to achieve a good purity, high molecular weight of PHA, but a moderate PHA recovery yield (~75%).

A high purity PHA (98%) may also be obtained by using a strong alkaline solution (pH 13.6), but at the expense of PHA recovery yield and molecular size. The native amorphous PHA granules are actually quite vulnerable to alkaline saponification and quickly decomposed into soluble products such as monomers and oligomers. Similar to hypochlorite, the base is consumed during solubilization of PHA and NPCM. Therefore, an appropriate concentration of the agents or digestion time must be controlled according to the residual non-PHA cell mass. Furthermore, the alkaline non-selective dissolution is limited to treatment of a cell mass of very high PHA content (70 wt % or above).

Although the purity, yield and molecular size of PHA recovered by non-selective dissolution have to be compromised, they can be significantly improved by using a selective dissolution in which the non-PHA cell mass is solubilized and PHA granules are left intact. Proteolytic enzymes, for example, have high activities on hydrolysis and dissolution of proteins, but little activity on PHA degradation. Typical processing of a PHA-containing cell slurry (60 wt % PHA) starts with heat treatment, followed by enzymatic hydrolysis, surfactant treatment and finally hydrogen peroxide decolorization.

Anionic surfactants such as sodium dodecyl sulfate (SDS) can also help dissolve the non-PHA cellular mass to some extent, with little degradation of polyesters. The treatment, however, uses a high dosage of surfactant (0.24 g surfactant per g cell mass), which would not only raise the recovery cost, but also cause problems in wastewater treatment. Although up to 50% of solvent extraction cost can be saved by using a sequential surfactant and hypochlorite digestion, the moderate polymer recovery yield (~75 wt %) and relatively high cost of chemical agents such as SDS and hypochlorite are the unsolved problems in production of biodegradable plastics, which can compete with synthetic polymers for a variety of environmentally friendly applications.

SUMMARY OF THE INVENTION

The present invention relates to a method to recover, purify and modify polyhydroxyalkanoate (PHA) biopolymer solids from PHA-containing cells, which comprises: (a) solubilizing non-PHA cell mass (NPCM) in an acidic solution, leaving a suspension of partially crystallized PHA solids; (b) adjusting the pH of the suspension to 7-11, and separating the PHA solids from the dissolved NPCM; (c) resuspending the PHA solids in a bleaching solution for decolorization; and (d) drying the resulting PHA solids. In embodiments, the acidic solution is prepared by adding an inorganic acid such as sulfuric acid into the slurry of cell mass, the pH of the suspension is adjusted with a base such as sodium hydroxide, and the bleaching agent is hypochlorite or hydrogen peroxide.

DESCRIPTION OF THE PREFERRED EMBODIMENTS

In a preferred embodiment, the present invention recovers polyhydroxyalkanoates to a high purity (greater than 97 wt %) from cell mass of moderate to high PHA contents (40-70 wt %). In a further preferred embodiment, the present invention provides such biopolyesters with a high molecular weight (average $M_w$=500 kDa or above) at a high recovery yield (>95 wt %).

Figure 1:
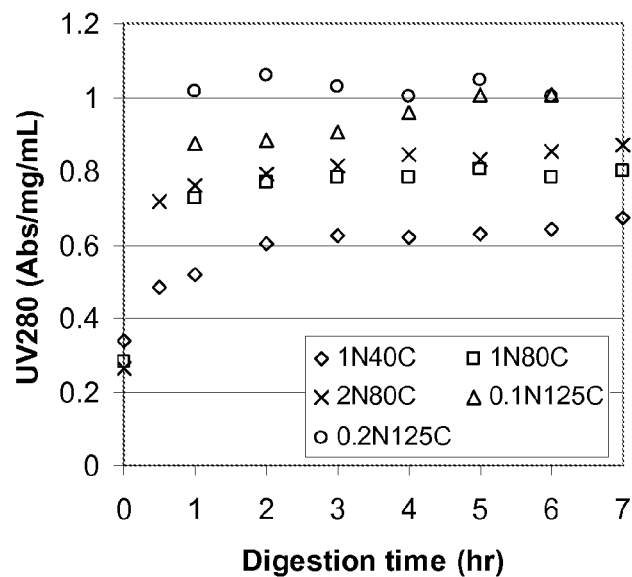
FIG. 1 is a diagram of the release of proteins from PHA-containing cell slurry (per g cells/L) in acidic solutions (0.1-2 N) at two temperatures (80 and 125° C.). The protein concentration in the supernatant of acidic solution is measured with UV absorption at 280 nm.

It has been found that PHA biopolymers in native amorphous granules are quite vulnerable to saponification in alkaline solution (0.1-1N $OH^-$), but are highly resistant to acidic hydrolysis. In sulfuric acid solutions (0.01-0.5 mole per liter $H^+$) at high temperatures (80-130° C.) for 14 hours, for example, little soluble hydrolytic products of PHA polyesters are formed from the PHA-containing cell mass. The non-PHA cell mass (NPCM), including peptidoglycan of cell walls, however, is vulnerable to acid solubilization, releasing proteins and other biological molecules into the aqueous solution. FIG. 1 shows that proteins were released quickly from the cells in the first two hours, as monitored with UV absorption at 280 nm of free polypeptides in supernatant. Both acid strength and temperature affect NPCM solubilization, and hence protein release: The former affects the initial digestion or release rate, and the latter determines the final extent of NPCM solubilization, suggesting that increased hydrophobic proteins located in cellular and/or PHA granule membranes are released at high temperatures. This demonstrates that an inorganic acid such as sulfuric acid, at low to moderate strength levels, is a selective agent that can dissolve the non-PHA cell mass into small debris, but causes little damage to PHA granules. The generated NPCM debris can be easily removed, such as by washing and centrifugation.

Figure 2:
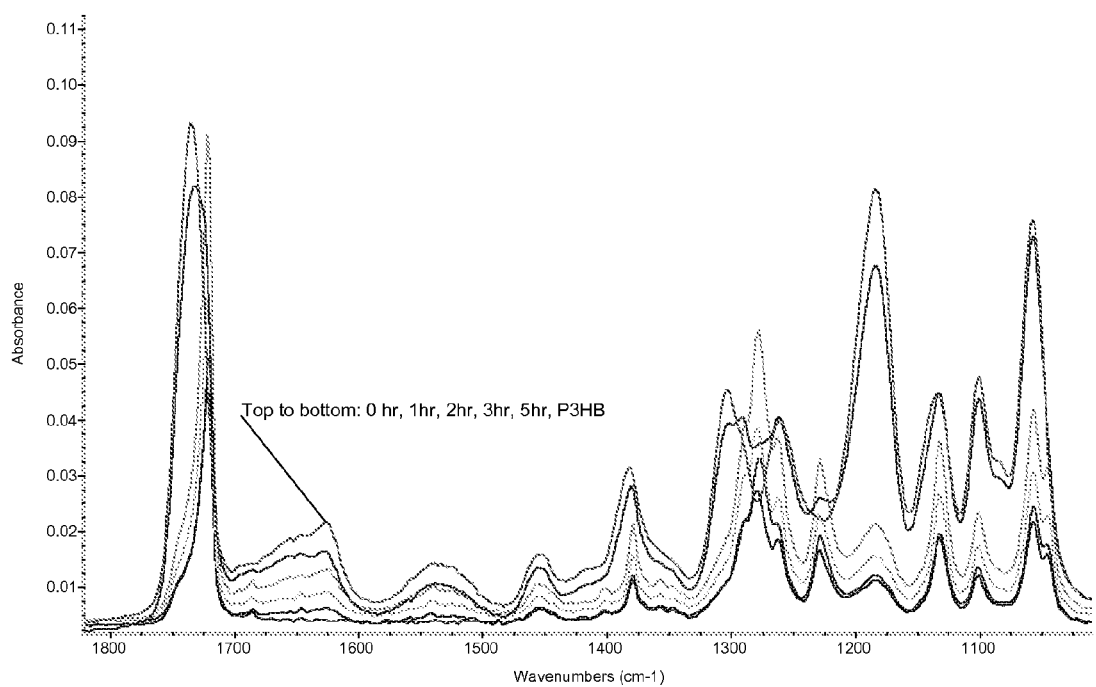
FIG. 2 are FTIR spectra of poly(3-hydroxybutyrate) (P3HB) and P3HB-containing cell mass after being treated in 1N sulfuric acid solution for different durations (from top to bottom): 0 hours (original cell mass), 1 hours, 2 hours, 3 hours, 5 hours and pure P3HB (bottom). (Note the declines of absorption peaks of protein amide I at ~1650 $cm^{-1}$ and amide II band at ~1540 $cm^{-1}$ (N—H bend) with acid dissolution. The IR absorption around 1177 $cm^{-1}$ reflects the crystallinity of PHA polymers, with a large peak referring to amorphous structure and a small peak referring to high crystallinity)

With proteins and other NPCM being solubilized into aqueous solution, the residual protein content in PHA-containing cell mass declines, as monitored with a FTIR. The FTIR spectra in FIG. 2 show the characteristic IR absorption peaks of proteins and polyesters. The absorption peaks of amino acids decline with acidic solubilization and the spectrum of PHA-containing cell mass approaches the spectrum of a pure PHA film. Furthermore, the very difference of IR absorption at 1177 $cm^{-1}$ reveals a major change in crystalline structure of PHA from the original amorphous structure (top) to the high crystallinity of pure PHA (bottom). This demonstrates that removal of proteins from PHA granules facilitates the crystallization of biopolyesters. Because the crystallized PHA macromolecules are highly resistant to chemical degradation, the residual NPCM, therefore, can be removed by chemical treatment, such as by hypochlorite decolorization, to a very high PHA purity (>97%) with a very high PHA recovery yield (>95%).

In accordance with the present invention, it was further found that although PHA macromolecules are highly resistant to acidic hydrolysis and few soluble hydrolytic products such as hydroxyalkanoates and their oligomers are formed, scission of the polyester backbones do occasionally occur to some extent, depending on the process conditions including pH, temperature (° C.) and time (minutes). Since the acidic solubilization of non-PHA cell mass also depends on the operation conditions, the three parameters (pH, temperature and reaction time) are combined into one as the severe factor (SF) of acid dissolution, defined as follows:

$$SF = \log\left\{t * \exp\left(\frac{T-100}{14.75}\right)\right\} - pH$$

Figure 3:
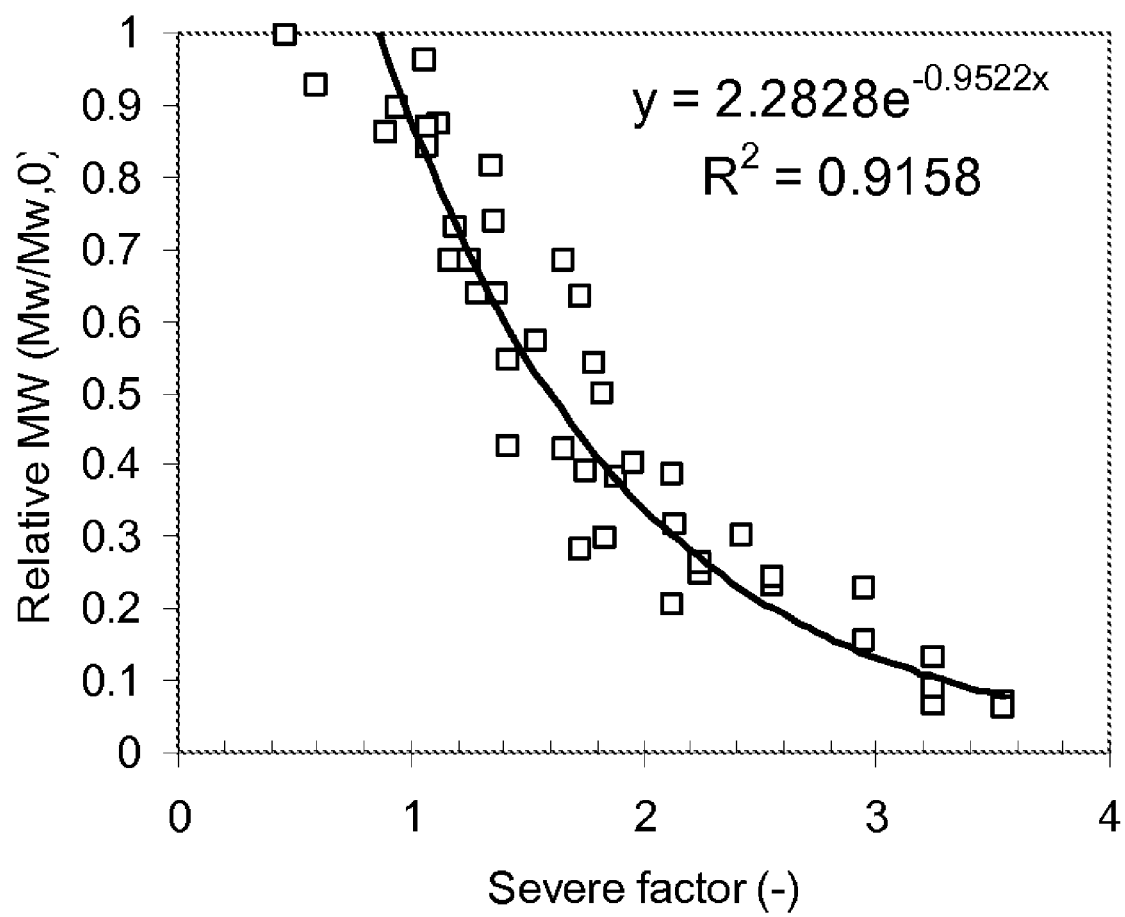
FIG. 3 is a graph of the effect of operation conditions (severe factor) in acidic solubilization of non-PHA cell mass on the average molecular weight ($M_w$) of PHA polyesters relative to the original molecular weight ($M_{w,0}$=1,400-1,600 kDa).

FIG. 3 shows that the relative average molecular weight ($M_w/M_{w,0}$) of PHA biopolyesters declines with increased severe factor, where $M_w$ refers to the weight-average molecular weight of PHA polymers in acid treatment and $M_{w,0}$ to the original PHA molecular weight in cells. The decline of molecular weight in acidic solubilization can be quantitatively predicted by controlling the value of severe factor, as shown in FIG. 3. In order to control the average molecular weight ($M_w$) of a product PHA equal to 50% or above of the original molecular weight ($M_{w,0}$=1,400 to 1,600 kDa) for a good mechanical strength, the operation conditions should be controlled to give a severe factor between 0.6 and 1.6, preferably between 0.8 and 1.2.

The processing is described as follows. The PHA-containing cells are first treated for dissolution of non-PHA cell mass in an acidic solution (0.01-0.5 N H$^+$, preferably 0.1-0.2 N) at 80 to 130° C., preferably 100-110° C., for 30 minutes to 4 hours, preferably 2 hours. The operation conditions are controlled for a severe factor ranging from 0.5 to 2, preferably between 0.8 and 1.3, so that a majority of NPCM is solubilized, and degradation of PHA molecular weight is avoided. The severe factors will give relative molecular weights ($M_w/M_{w,0}$) ranging from 0.5 to 1, giving final PHA products of desired mechanical strength. At the end of acidic solubilization, the pH of the suspension is adjusted to 7 to 11, preferably 10, by adding a base such as NaOH. The suspension is then centrifuged at 4,000 g for 20 minutes and the supernatant is discarded for treatment or reuse. The wet pellets, after being washed with an equal volume of water, are resuspended in a bleaching solution (pH 10 and 6 wt % sodium hypochlorite) for decolorization. For one part of sodium hypochlorite, 0.5 to 10 parts of PHA-containing solids, preferably 1 to 2 parts, are added. The decolorization was carried out for 1 to 5 hours, preferably 2 hours at ambient temperature. The PHA solids are recovered with centrifugation at 4,000 g for 20 minutes, washed with an equal volume of water, and dried in oven at 60 to 120° C. The drying temperature is controlled at 30-50° C. below the melting point of PHA polyesters. The white powders of PHA products can be dissolved in an organic solvent such as chloroform for film cast or melted and molded into pellets and a variety of articles.

EXAMPLES

In the following examples, PHA biopolyesters are recovered and purified from PHA-containing cell mass, such as gram-negative bacterial cells. The PHA composition and content in the cell mass, residual solids and final PHA products were determined by methanolysis of PHA polymers into methyl hydroxyalkanoates. Analysis of the hydroxyalkanoic acids is performed with HPLC after the methyl esters are hydrolyzed into corresponding acids in alkaline condition. The average molecular weight of PHA was determined from a molecular weight distribution of PHA polymers in chloroform solution by using a size exclusion chromatography calibrated with polystyrene standards.

Example 1

A cell slurry of 75 g dry solids/L with 58.8 wt % of poly (3-hydroxybutyrate) was treated in 0.1 M $H_2SO_4$ at 100° C. for 120 minutes (severe factor (SF)=1.38). The suspension was cooled to room temperature, adjusted to pH 10, and then subjected to centrifugation at 4,000 g for 20 minutes, followed by washing with an equal volume of water. Decolorization was allowed for 2 hours at ambient temperature in a bleaching solution containing 3 wt % of PHA-containing solids and 6 wt % of sodium hypochlorite (pH 10). The same slurry was also boiled in 0.05 M $H_2SO_4$, at 100° C. for 60 min (severe factor SF=0.78) and treated in the same way as above. The results are compared in the following table (Table 1):

TABLE 1

| SF | PHA Purity (wt %) | Yield* (wt %) | MW (kDa) | Solubility in chloroform and cast films |
| --- | --- | --- | --- | --- |
| 1.38 | 99.9 | 94.9 | 825 | Clean solution, cast film with good strength |
| 0.78 | 94.7 | 94.5 | 1,275 | Little turbid, cast film with good strength |

(Yield*: The percentage of PHA recovered from the original PHA mass contained in cell mass.)

Example 2

Four equal samples of cell slurry, containing 3.8 wt % of dry cell mass with 61 wt % of homopolymer, poly(3-hydroxybutyrate)(P3HB), were treated in parallel in the conditions as described in Example 1. After acidic treatment and pH adjustment to 10, individual samples were collected for measurement of the residual solids and P3HB content. The purity and yield of P3HB in the process were determined and compared as follows (Table 2):

TABLE 2

| Step | Description | PHA Purity (wt % solids) | Recovery Yield (wt % PHA) |
| --- | --- | --- | --- |
| 1 | Original cell mass | 61 | 100 |
| 2 | After acid treatment | 89.3 | 98.6 |
| 3 | After adjusted to pH10 | 96.4 | 100 |
| 4 | After decolorization | 97.9 | 98.7 |

Example 3

In this example, a copolymer of 3-hydroxybutyrate (3HB 78.2 wt %) and 3-hydroxyvalerate (3HV 21.8 wt %) were recovered and purified from a PHA-containing cell mass. Four equal samples of cell slurry, containing 0.05 M $H_2SO_4$ and 3.7 wt % of dry cell mass with 46.4 wt % of PHA were treated in parallel at 121° C. for 30 minutes (SF 1.4). After acid treatment and pH adjustment to 10, individual samples were collected for measurement of the residual solids, 3HB content, 3HV content and total PHA content. The purity and yield of PHA recovered in the process were determined and compared as follows:

TABLE 3

| Step | Description | 3HB (wt %) | 3HV (wt %) | PHA Purity (wt % solid) | PHA Yield (wt % PHA) |
| --- | --- | --- | --- | --- | --- |
| 1 | Original cell mass | 34.3 | 7.9 | 42.2 | 100 |
| 2 | After acid treatment | 70.3 | 18.7 | 89 | 98.9 |
| 3 | After Ph adjustment | 76.3 | 19.9 | 96.2 | 97.7 |
| 4 | After decolorization | 77.0 | 21.5 | 98.5 | 95.4 |

Example 4

In this example, a terpolymer consisting of 3HB (74.4 wt %), 3HV (20.3 wt %) and 4HV (1 wt %) was recovered and purified from cell mass containing 59.7 wt % of PHA. Four equal samples of cell slurry containing 7 wt % of solids were treated in 0.1 M $H_2SO_4$ at 100° C. for 120 min. After the pH was adjusted to 10 and washed once with an equal volume of water, the wet pellets were decolorized at ambient temperature for 2 hours in a bleaching solution (Clorox®) with 1 part of sodium hypochlorite to 1 part of PHA-containing solids. Individual samples were collected after the acid solubilization and pH adjustment, respectively. The amount of residual solids and the contents of 3HB, 3HV and 4HV were measured for determination of the purity and yield of PHA recovered step by step as given in Table 4.

TABLE 4

| Step | Description | 3HB (wt %) | 3HV (wt %) | 4HV (wt %) | PHA Purity (wt % solid) | PHA Yield (wt % PHA) |
|---|---|---|---|---|---|---|
| 1 | Original cell mass | 44.9 | 12.6 | 2.2 | 59.7 | 100 |
| 2 | After acid treatment | 57.1 | 16.6 | 2.0 | 75.7 | 93.7 |
| 3 | After pH adjustment | 62.7 | 17.3 | 1.9 | 81.9 | 94.8 |
| 4 | After decolorization | 74.4 | 20.9 | 1.1 | 96.4 | 94.8 |

Example 5

In this example, different ratios of hypochlorite to PHA-containing cell mass were used to show the efficiency of acidic solubilization and final decolorization on polymer purity and recovery. A cell slurry of 86 g/L containing 65% PHA was boiled at 100° C. in 0.1 M $H_2SO_4$ for 1 hour. After pH adjustment and washing, the wet pellets were resuspended and divided into 5 equal parts. A bleaching solution containing 6 wt % hypochlorite (pH 10) was added and stirred for 2 hours at ambient temperature. The residual solid and PHA content were determined and compared in Table 5.

TABLE 5

| Sample | NaClO (g/L) | NaClO/Cell (wt/wt) | Purity (%) | Yield* (%) | Solids color/ solubility in chloroform |
|---|---|---|---|---|---|
| H0 | 0 | 0 | 90.4 | 100 | Grayish/insoluble debris |
| H1 | 2.5 | 0.1 | 94 | 99.2 | Yellow/some insoluble debris |
| H2 | 12.3 | 0.5 | 98.9 | 96.2 | White powder/clean solution |
| H3 | 24.6 | 1 | 97.8 | 96.8 | White powder/clean solution |
| H4 | 49.3 | 2 | 98.2 | 98 | White powder/clean solution |

(The recovery yield of PHA refers to the amount of PHA recovered in solids).

Example 6

For comparison with the results in Example 5, the same cell slurry was treated only with hypochlorite at ambient temperature. A bleaching solution containing 6 wt % sodium hypochlorite (pH 10) was mixed with a different amount of slurry at a predetermined ratio of NaClO to cell mass, and stirred for 2 hours. The results are shown in Table 6.

TABLE 6

| Sample | Cell (wt %) | NaClO/Cell (wt/wt) | PHA purity (%) | PHA recovery (%) |
|---|---|---|---|---|
| H-1 | 1.07 | 5.6 | 92.5 | 70.1 |
| H-2 | 2.31 | 2.6 | 89.1 | 69.1 |
| H-3 | 3.75 | 1.6 | 82.2 | 64.4 |
| H-4 | 7.52 | 0.8 | 75.1 | 57.4 |

While the present invention has been described with respect to particular embodiments thereof, it is apparent that numerous other forms and modifications of the invention will be obvious to those skilled in the art. The appended claims and this invention generally should be construed to cover all such obvious forms and modifications, which are within the true spirit and scope of the present invention.

What is claimed is:

1. A method to recover, purify and modify polyhydroxyalkanoate (PHA) biopolymer solids from PHA-containing cells, which comprises the sequential steps of: (a) solubilizing non-PHA cell mass (NPCM) in an acidic solution, resulting in a suspension of partially crystallized PHA solids; (b) adjusting the pH of the suspension to 7-11, -and separating the PHA solids from the dissolved NPCM by filtration or centrifugation; (c) resuspending the PHA solids in a bleaching solution for decolorization; and (d) drying the resulting PHA solids, wherein hydrogen ions ($H^+$) released from an inorganic acid added to a slurry of PHA-containing cells are used to recover the PHA biopolymer solids from the PHA-containing cells.

2. The method as recited in claim 1, wherein the inorganic acid is sulfuric acid.

3. The method as recited in claim 1, wherein the concentration of hydrogen ion ($H^+$) is 0.01 to 0.5 mole per liter.

4. The method as recited in claim 1, wherein the temperature of the acidic solution is 80-130° C.

5. The method as recited in claim 4, wherein the treatment time is 0.54-4 hours.

6. The method as recited in claim 1, wherein a base is added to the suspension of PHA solids.

7. The method as recited in claim 6, wherein the base is sodium hydroxide.

8. The method as recited in claim 5, wherein the pH of the suspension is adjusted to 7-10.

9. The method as recited in claim 1, wherein the bleaching solution comprises hypochlorite.

10. The method as recited in claim 1, wherein one part of hypochlorite is added per 0.5 to 10 parts of PHA solids.

11. The method as recited in claim 1, wherein the color of PHA solids is removed under ambient conditions.

12. The method as recited in claim 1, wherein the time for decolorization is 1 to 5 hours.

13. The method as recited in claim 1, wherein the PHA solids are dried at 60° C.-120° C.

14. The method as recited in claim 1, wherein the dried PHA solids are soluble in chloroform.

15. The method as recited in claim 1, wherein the purity of the PHA solids is about 97% or greater.

16. The method as recited in claim 1, wherein at least about 95% of PHA solids are recovered from the PHA-containing cells.

17. The method as recited in claim 1, wherein the PHA solids are biopolyesters.

18. The method as recited in claim 17, wherein the molecular weight of the biopolyesters is 500 kDa or greater.

* * * * *